United States Patent [19]
Ono

[11] Patent Number: 5,987,879
[45] Date of Patent: Nov. 23, 1999

[54] SPRING SEAL DEVICE FOR COMBUSTOR

[75] Inventor: Masaki Ono, Takasago, Japan

[73] Assignee: Mitsubishi Jukogyo Kabushiki Kaisha, Tokyo, Japan

[21] Appl. No.: 08/913,572

[22] PCT Filed: Jan. 14, 1997

[86] PCT No.: PCT/JP97/00057

§ 371 Date: Sep. 17, 1997

§ 102(e) Date: Sep. 17, 1997

[87] PCT Pub. No.: WO97/26485

PCT Pub. Date: Jul. 24, 1997

[30] Foreign Application Priority Data

Jan. 17, 1996 [JP] Japan ................................ 8-5606

[51] Int. Cl.⁶ .................................................. F02C 7/20
[52] U.S. Cl. .................... 60/39.32; 60/39.31; 60/39.37
[58] Field of Search ............................ 60/39.32, 39.31, 60/39.37

[56] References Cited

U.S. PATENT DOCUMENTS

| | | | |
|---|---|---|---|
| 3,344,601 | 10/1967 | Mieczkowski, Jr. | 60/39.32 |
| 3,759,038 | 9/1973 | Scalzo et al. | 60/39.32 |
| 4,640,092 | 2/1987 | Coburn et al. | 60/39.36 |
| 4,688,378 | 8/1987 | Harris | 60/39.32 |
| 4,805,397 | 2/1989 | Barbier et al. | 60/39.32 |
| 4,912,922 | 4/1990 | Maclin | 60/39.32 |
| 5,749,218 | 5/1998 | Cromer et al. | 60/39.31 |

FOREIGN PATENT DOCUMENTS

| | | |
|---|---|---|
| 51-012763 | 4/1976 | Japan . |
| 58-102031 | 6/1983 | Japan . |
| 60-030431 | 2/1985 | Japan . |
| 61-173024 | 8/1986 | Japan . |
| 7-293276 | 11/1995 | Japan . |

*Primary Examiner*—Timothy S. Thorpe
*Assistant Examiner*—Ehud Gartenberg
*Attorney, Agent, or Firm*—Wenderoth, Lind & Ponack, L.L.P.

[57] ABSTRACT

To provide a spring seal device for connecting inner tube and tail tube of combustor by which air leakage caused by aged deterioration of spring seal is prevented.

The spring seal 3, 4 for connecting the inner tube 1 and the tail tube 2 of combustor is fitted at its end portion on the upstream side to outer circumference of the inner tube 1.

The downstream side end portion of the spring seal 3, 4 is pinched between inner circumference of the tail tube 2 and a spring seal guide 5 fitted thereto and connects the inner tube 1 and the tail tube 2. At the time of start and stop of gas turbine, the spring seal slides in the spring seal guide 5, thereby thermal deformation is absorbed.

12 Claims, 5 Drawing Sheets

SPRING SEAL DEVICE FOR COMBUSTOR

BACKGROUND OF THE INVENTION

1. Field of the Invention

The present invention relates to a spring seal device for connecting an inner tube and a tail tube in a combustor for a gas turbine etc.

2. Description of the Prior Art

FIG. 7 is a schematic cross sectional view of a prior art gas turbine combustor. Fuel, together with air from a compressor, is burnt in an inner tube 1 and a tail tube 2 provided in a turbine cylinder 6 to generate a high temperature combustion gas, which combustion gas is supplied into the turbine for driving it.

FIG. 8 is an enlarged cross sectional view of the combustor portion. As shown there, the combustor has a structure constructed by the inner tube 1 and the tail tube 2 mainly for a purpose of absorbing a thermal deformation. A spring seal 3, 4 is provided mainly for preventing air leakage from between the inner tube 1 and the tail tube 2, which spring seal is one kind of a plate spring for preventing air leakage from between the inner tube 1 and the tail tube 2 even if there occurs a thermal deformation. Said spring seal also functions to increase vibration damping of the structural system.

In FIGS. 9 to 11, a prior art seal spring portion is shown enlargedly. The spring seal is of a double structure of an outer seal plate 3 and an inner seal plate 4 in which, at an end portion of the seal plate, the inner seal plate 4 is overlapped on a cut-out portion of the outer seal plate 3, as shown in FIG. 10, so that a leakage from the cut-out portion of the outer seal plate 3 is prevented by the inner seal plate 4. Also, a stopper 9 is provided for restricting a deformation of the seal plate caused by a thermal expansion.

In the gas turbine combustor, there occurs a large differential temperature between the ordinary temperature during operation stop and a temperature of approximately 1,000° C. during operation, so that a large thermal deformation occurs both in the axial direction and in the radial direction. While several tens times of starts and stops of the gas turbine are repeated, there progresses a permanent settling gradually of the spring seal which had been of a predetermined dimension at the time of inspection so as not to return to the original state and a gap is sometimes generated between the tail tube 2 and the spring seal 3, 4.

If air leaks through said gap from within the turbine cylinder into the combustor, a fuel-air ratio (ratio of fuel to air) in the combustor varies and a combustion condition varies, which often gives an unfavorable influence on $NO_x$ generation and combustion vibration.

Also, a fluid flowing through said gap causes a self-exciting vibration due to so called a clearance flow and the spring seal is caused to vibrate furiously so that there arises a fear of damage of the spring seal. And if a fraction of the spring seal plunges into the combustor, there is considered a possibility of a large accident, such as damage of turbine blades.

It is therefore an object of the present invention to provide a spring seal device for a combustor in which a spring seal for connecting an inner tube and a tail tube of the combustor is constructed so as not to cause an air leakage due to an aged deterioration thereof.

SUMMARY OF THE INVENTION

In order to solve said problems in the prior art, the present invention provides a spring seal device for a combustor of a gas turbine etc. which is constructed to comprise a spring seal guide which pinches an end portion of a spring seal between itself and an outer wall of an inner tube of the combustor or between itself and an inner wall of a tail tube of the combustor to connect said inner tube and said tail tube.

The other end portion of the spring seal which is opposite to that pinched between the spring seal guide and the outer wall of the inner tube or between the spring seal guide and the inner wall of the tail tube is fixed to the inner wall of the tail tube or to the outer wall of the inner tube by an appropriate fixing means.

The spring seal may consist of an inner spring seal and an outer spring seal, same as in the prior art. Also, the spring seal may be provided all around the circumference of the outer wall of the inner tube or of the inner wall of the tail tube.

In the spring seal device according to the present invention so constructed, the outer spring seal and the inner spring seal, that have been confirmed to be a predetermined dimension at the time of inspection, are reassembled so as to be guided by the spring seal guide to fit in between the spring seal guide and the outer wall of the inner tube or the inner wall of the tail tube all around the circumference thereof.

When a thermal deformation occurs at the time of start and stop of the gas turbine, said spring seal slides in the spring seal guide, thereby the thermal deformation is absorbed, and moreover even if several tens times of starts and stops are repeated, such sliding movement is repeated in the spring seal guide, and there is generated no gap and no large leakage occurs.

According to the spring seal device of the present invention, therefore, unfavorable influence on $NO_x$ generation and combustion vibration accompanying with change of a combustion condition as well as damage of the spring seal due to self-exciting vibration can be avoided.

DESCRIPTION OF THE PREFERRED EMBODIMENTS

Herebelow, description is made concretely on embodiments of a spring seal device for a combustor according to the present invention with reference to FIGS. 1 to 6. It is to be noted that, in the embodiments below, same structural part as in the prior art devices shown in FIGS. 7 to 11 is given a same numeral designation for simplicity purpose.

Figure 1:
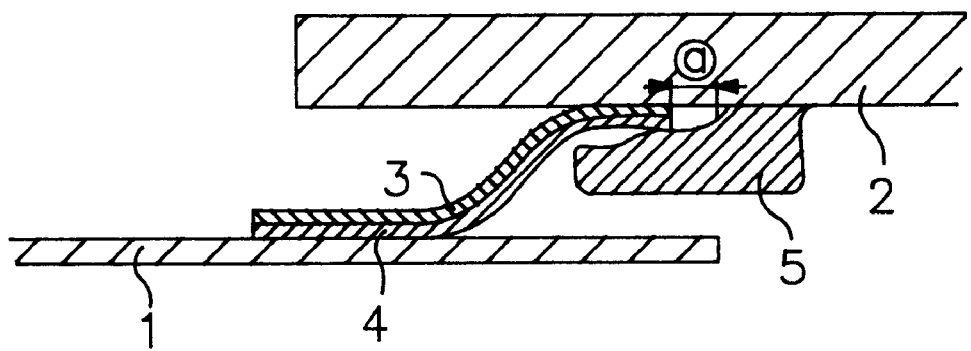
FIG. 1 is a cross sectional view showing structure of a spring seal of a first embodiment according to the present invention.
Figure 2:
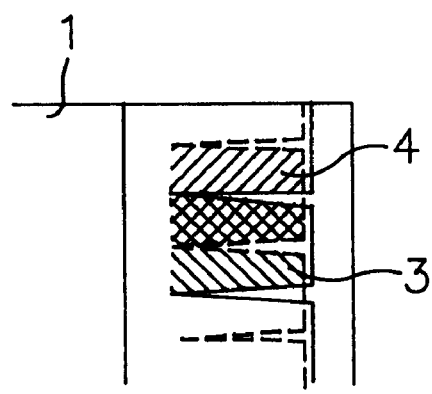
FIG. 2 is a plan view of the spring seal of FIG. 1.
Figure 3:
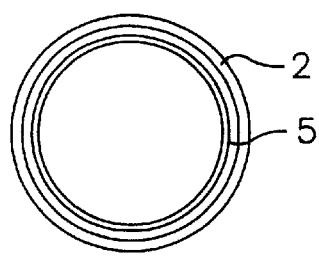
FIG. 3 is an end view of the spring seal of FIG. 1 seen in axial direction thereof.

First, a spring seal device of a first embodiment shown in FIGS. 1 to 3 is described.

Figure 9:
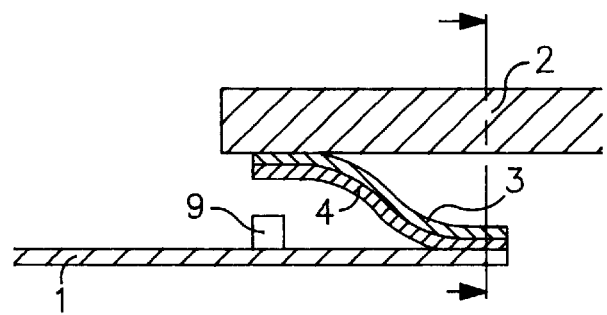
FIG. 9 is a cross sectional view showing structure of a spring seal of the prior art gas turbine combustor.
Figure 10:
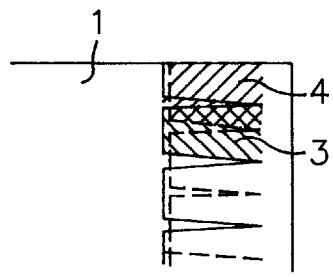
FIG. 10 is a plan view of the spring seal of FIG. 9.
Figure 11:
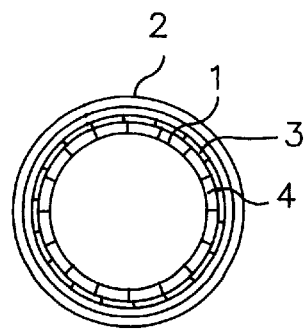
FIG. 11 is an end view of the spring seal of FIG. 9 seen from arrows in axial direction thereof.

In this spring seal device of the first embodiment, contrary to the fitting mode of the prior art spring seal shown in FIG. 9, an inner spring seal 4 and an outer spring seal 3 are fitted to an inner tube 1 such that their upstream side of the inner tube 1 is fixed and their downstream side of the inner tube 1 is made in a free end.

And a spring seal guide 5 is provided all around an inner circumference of a tail tube 2. When the inner tube 1 is to be assembled into a turbine cylinder 6 (see FIG. 7), the free end of the outer spring seal 3 and the inner spring seal 4 is fitted into the spring seal guide 5 along the entire inner circumference of the tail tube 2. Thus, at the time of start and stop of operation, the inner spring seal 4 and the outer spring seal 3 slide in a space a of the spring seal guide 5 so that a thermal deformation is absorbed.

Further, deformation (settling) of the outer spring seal 3 and the inner spring seal 4 caused by the thermal deformation of the inner tube 1 and the tail tube 2 is prevented by the spring seal guide 5 and generation of gap between the tail tube 2 and the spring seal 3, 4 is also prevented, so that air leakage from the turbine cylinder into the combustor is prevented and generation of self-exciting vibration of the spring seal 3, 4 is prevented.

Thereby, variation of a combustion condition caused by air leakage from the turbine cylinder 6 into the combustor accompanying with aged deterioration as well as unfavorable influence given on $NO_x$ generation and combustion vibration are avoided, and damage of the spring seal 3, 4 due to generation of self-exciting vibration is prevented and reliability of the combustor can be enhanced.

Figure 4:
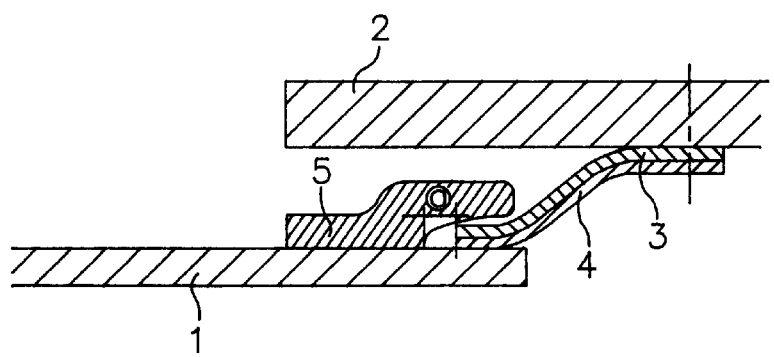
FIG. 4 is a cross sectional view showing structure of a spring seal of a second embodiment according to the present invention.
Figure 5:
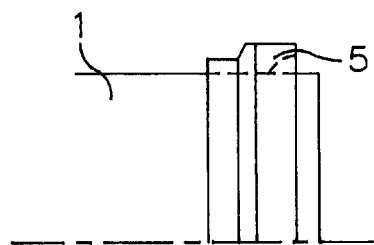
FIG. 5 is a side view of the spring seal of FIG. 4.
Figure 6:
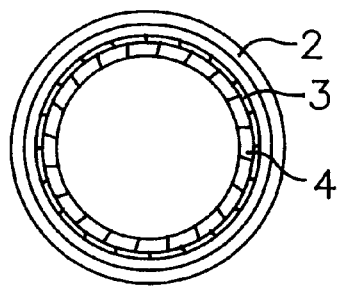
FIG. 6 is an end view of the spring seal of FIG. 4 seen in axial direction thereof.
Figure 7:
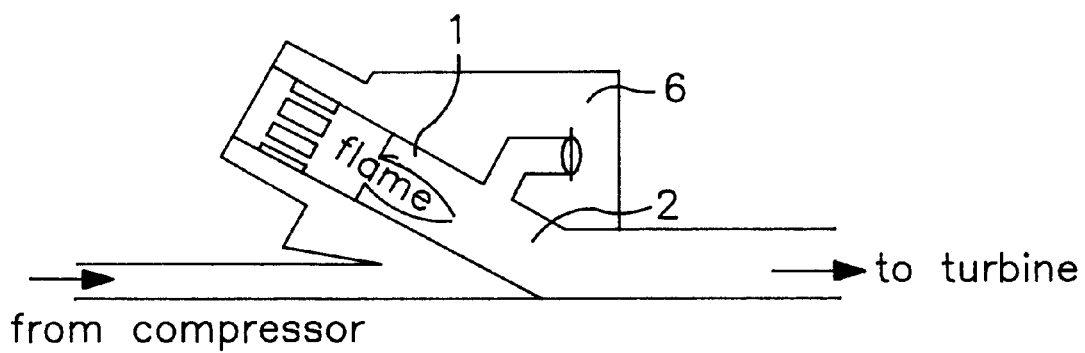
FIG. 7 is an explanatory view showing structure of a prior art gas turbine combustor.
Figure 8:
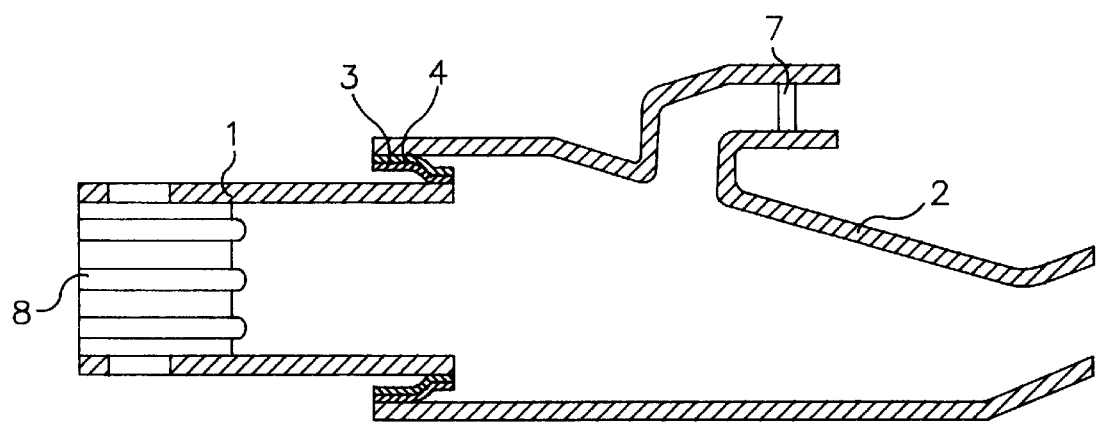
FIG. 8 is a cross sectional view of a combustor portion of the prior art gas turbine combustor.

A spring seal device of a second embodiment according to the present invention is shown in FIGS. 4 to 6. In this second embodiment, an inner spring seal 4 and an outer spring seal 3 are fitted to a tail tube 2 such that their upstream side of the tail tube 2 is made in a free end and their downstream side of the tail tube 2 is made in a fixed end. And a spring seal guide 5 is provided all around an outer circumference of an inner tube 1.

When the inner tube 1 is to be assembled into a turbine cylinder 6, the free end of the outer spring seal 3 and the inner spring seal 4 is fitted into the spring seal guide 5 along the entire outer circumference of the inner tube 1. In this second embodiment also, same function and effect as the spring seal device of the first embodiment as mentioned above can be obtained.

According to the spring seal device of the present invention, the spring seal is fitted into the spring seal guide so that the spring seal may slide in the spring seal guide at the time of operation start and stop, thereby the thermal deformation is absorbed and, for avoiding settling of the spring seal due to thermal deformation, air leakage from the turbine cylinder into the combustor can be prevented.

As a result thereof, unfavorable influence on $NO_x$ generation and combustion vibration accompanying with variation of a combustion condition due to air leakage as well as damage of the spring seal due to self-exciting vibration can be prevented and reliability of the gas turbine can be enhanced.

What is claimed is:

1. A spring seal device for a combustor connecting an inner tube and a tail tube thereof, comprising a spring seal guide which pinches an end portion of a spring seal of said spring seal device between itself and any one of an outer wall of said inner tube and an inner wall of said tail tube to connect said inner tube and said tail tube.

2. A spring seal device for a combustor as claimed in claim 1, wherein an upstream side of said spring seal is fixed to the outer wall of said inner tube and a downstream side of said spring seal is pinched so as to be free between the inner wall of said tail tube and said spring seal guide to connect said inner tube and said tail tube.

3. A spring seal device for a combustor as claimed in claim 1, wherein the downstream side of said spring seal is fixed to the inner wall of said tail tube and the upstream side of said spring seal is pinched so as to be free between the outer wall of said inner tube and said spring seal guide to connect said inner tube and said tail tube.

4. A spring seal device for a combustor as claimed in claim 1, wherein said spring seal guide is provided all around a circumference of the outer wall of said inner tube or of the inner wall of said tail tube.

5. A spring seal device for a combustor as claimed in claim 1, wherein said spring seal consists of an inner spring seal and an outer spring seal.

6. A spring seal device for a combustor as claimed in claim 1, wherein said combustor is a gas turbine combustor.

7. A spring seal device for a combustor as claimed in claim 2, wherein said spring seal guide is provided all around a circumference of the outer wall of said inner tube or of the inner wall of said tail tube.

8. A spring seal device for a combustor as claimed in claim 3, wherein said spring seal guide is provided all around a circumference of the outer wall of said inner tube or of the inner wall of said tail tube.

9. A spring seal device for a combustor as claimed in claim 2, wherein said spring seal consists of an inner spring seal and an outer spring seal.

10. A spring seal device for a combustor as claimed in claim 3, wherein said spring seal consists of an inner spring seal and an outer spring seal.

11. A spring seal device for a combustor as claimed in claim 2, wherein said combustor is a gas turbine combustor.

12. A spring seal device for a combustor as claimed in claim 3, wherein said combustor is a gas turbine combustor.

* * * * *